US012631271B2

(12) United States Patent (10) Patent No.: US 12,631,271 B2

Cheng (45) Date of Patent: *May 19, 2026

(54) PIPELINE STRUCTURE WITH VALVE

(71) Applicant: YUAN MEI CORP., Changhua County (TW)

(72) Inventor: Chi-Han Cheng, Changhua County (TW)

(73) Assignee: YUAN MEI CORP., Changhua County (TW)

( * ) Notice: Subject to any disclaimer, the term of this patent is extended or adjusted under 35 U.S.C. 154(b) by 25 days.

This patent is subject to a terminal disclaimer.

(21) Appl. No.: 18/392,093

(22) Filed: Dec. 21, 2023

(65) Prior Publication Data

US 2025/0207696 A1 Jun. 26, 2025

(51) Int. Cl.
*F16K 31/08* (2006.01)
*F16K 27/02* (2006.01)
*F16L 19/02* (2006.01)

(52) U.S. Cl.
CPC ........ *F16L 19/0237* (2013.01); *F16K 27/029* (2013.01); *F16K 31/086* (2013.01)

(58) Field of Classification Search
CPC ...... F16K 27/029; F16K 31/086; F16K 31/40; F16L 19/0237
See application file for complete search history.

(56) References Cited

U.S. PATENT DOCUMENTS 3,076,630 A * 2/1963 Hammond ............ F16K 31/402
251/38
3,672,627 A * 6/1972 McCarty, Jr. ......... F16K 31/404
251/30.03
3,872,878 A * 3/1975 Kozel ................... F16K 31/404
251/30.03

(Continued)

FOREIGN PATENT DOCUMENTS

CN 201344281 Y 11/2009
CN 204004699 U 12/2014

(Continued)

OTHER PUBLICATIONS

Extended European Search Report dated Jun. 12, 2024 in application No. EU23219031.4.

(Continued)

*Primary Examiner* — Umashankar Venkatesan
(74) *Attorney, Agent, or Firm* — R. Burns Israelsen

(57) ABSTRACT

A pipeline structure includes a connection pipe and a flow controller. The connection pipe includes inflow and outflow passages and an accommodation part that is located therebetween and has upper and lower flow chambers in fluid communication with each other, first and second inlet channels and an outlet channel. The first inlet channel is in fluid communication with the inflow passage and the upper flow chamber, and is formed by a side wall standing at the inflow passage. The second inlet channel is in fluid communication with the inflow passage and the lower flow chamber. The outlet channel is in fluid communication with the lower flow (Continued)

chamber and the outflow passage. The flow controller enables or interrupts fluid communications between the upper and lower flow chambers and between the second inlet channel and the lower flow chamber.

11 Claims, 8 Drawing Sheets

(56) References Cited

U.S. PATENT DOCUMENTS

| | | | | |
|---|---|---|---|---|
| 4,351,509 | A * | 9/1982 | Stampfli | F16K 31/404 |
| | | | | 251/38 |
| 4,796,854 | A | 1/1989 | Ewing | |
| 4,860,990 | A * | 8/1989 | Fukuzawa | F16K 31/404 |
| | | | | 251/126 |
| 5,145,145 | A * | 9/1992 | Pick | F16K 31/404 |
| | | | | 251/30.05 |
| 5,363,873 | A | 11/1994 | Richmond | |
| 5,979,482 | A | 11/1999 | Scott | |
| 6,394,126 | B2 | 5/2002 | Lohde et al. | |
| 6,457,697 | B1 * | 10/2002 | Kolze | F16K 31/404 |
| | | | | 251/30.02 |
| 6,729,601 | B2 | 5/2004 | Freisinger et al. | |
| 7,481,412 | B2 * | 1/2009 | Ishikawa | F16K 31/0658 |
| | | | | 251/368 |
| 7,694,934 | B2 | 4/2010 | Irwin | |
| 7,703,740 | B1 * | 4/2010 | Franklin | F16K 31/404 |
| | | | | 251/39 |
| 8,500,087 | B2 * | 8/2013 | Cheng | F16K 31/404 |
| | | | | 251/30.05 |
| 8,662,107 | B2 * | 3/2014 | Cheng | F16K 3/08 |
| | | | | 137/599.05 |
| 9,194,501 | B2 * | 11/2015 | Cunningham | F16K 39/022 |
| 10,077,709 | B2 * | 9/2018 | Turner | F16K 31/40 |
| 12,007,038 | B2 * | 6/2024 | Wang | F16K 31/404 |
| 2005/0178989 | A1 * | 8/2005 | Stern | F16K 31/404 |
| | | | | 251/30.03 |
| 2008/0042088 | A1 | 2/2008 | Suzuki | |
| 2008/0289693 | A1 | 11/2008 | Irwin et al. | |
| 2013/0032740 | A1 * | 2/2013 | Ro | F16K 31/404 |
| | | | | 251/129.15 |
| 2014/0261743 | A1 * | 9/2014 | Schreier | F16K 31/126 |
| | | | | 137/15.18 |
| 2020/0132210 | A1 * | 4/2020 | Lai | F16K 27/0236 |
| 2020/0332906 | A1 | 10/2020 | Niess et al. | |

FOREIGN PATENT DOCUMENTS

| | | |
|---|---|---|
| DE | 19545532 A1 | 6/1996 |
| EP | 0 157 378 A2 | 10/1985 |
| EP | 1 120 593 B1 | 3/2008 |
| EP | 2455644 A1 | 5/2012 |
| KR | 20180111654 A | 10/2018 |
| WO | 96/11350 A1 | 4/1996 |
| WO | 2015/036706 A1 | 3/2015 |

OTHER PUBLICATIONS

UKIPO Office Action dated Jun. 24, 2024 in application 2319739.5.
CA Office Action dated Oct. 11, 2024 in application 3224364.

* cited by examiner

PIPELINE STRUCTURE WITH VALVE

TECHNICAL FIELD

The present disclosure relates to a pipeline structure, more particularly to a pipeline structure with a valve.

BACKGROUND

A controlling valve is typically disposed in water pipeline to control the flow supply.

However, during the control to the valve for the flow supply, the fluid communication inside the pipeline may be affected due to unwantedly interference of internal components thereof, which may block the controlling valve and causes the flow supply unstable. Therefore, how to design a pipeline structure capable of stably supplying flow has already become an important issue in the related field.

SUMMARY

The present disclosure provides a pipeline structure with a valve capable of stably supplying flow.

According to one aspect of the present disclosure, a pipeline structure with a valve includes a connection pipe and a flow controller. The connection pipe includes an inflow passage, an outflow passage and an accommodation part that is located between the inflow passage and the outflow passage. The accommodation part has a flow chamber, a first inlet channel, a second inlet channel and an outlet channel. The flow chamber has an upper flow chamber and a lower flow chamber that are in fluid communication with each other. The first inlet channel is in fluid communication with the inflow passage and the upper flow chamber. The first inlet channel is formed by a side wall standing at the inflow passage. The second inlet channel is in fluid communication with the inflow passage and the lower flow chamber. The outlet channel is in fluid communication with the lower flow chamber and the outflow passage. The flow controller is disposed in the flow chamber. The flow controller is configured to selectively enable or interrupt a fluid communication between the upper flow chamber and the lower flow chamber and a fluid communication between the second inlet channel and the lower flow chamber.

According to the pipeline structure with a valve discussed above, since the first inlet channel is formed at the side wall standing at the inflow passage, the fluid communication between the inflow passage and the upper flow chamber can be separated from the elastic pad of the flow controller. Accordingly, the enablement and interruption of the fluid communication between the upper flow chamber and the lower flow chamber and the enablement and interruption of the fluid communication between the second inlet channel and the lower flow chamber would not be affected by the elastic deformation of the elastic pad, and thereby a stable flow can be supplied to the upper flow chamber.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Aspects and advantages of the invention will become apparent from the following detailed descriptions with the accompanying drawings. For purposes of explanation, one or more specific embodiments are given to provide a thorough understanding of the invention, and which are described in sufficient detail to enable one skilled in the art to practice the described embodiments. It should be understood that the following descriptions are not intended to limit the embodiments to one specific embodiment. On the contrary, it is intended to cover alternatives, modifications, and equivalents as can be included within the spirit and scope of the described embodiments as defined by the appended claims.

Figure 1:
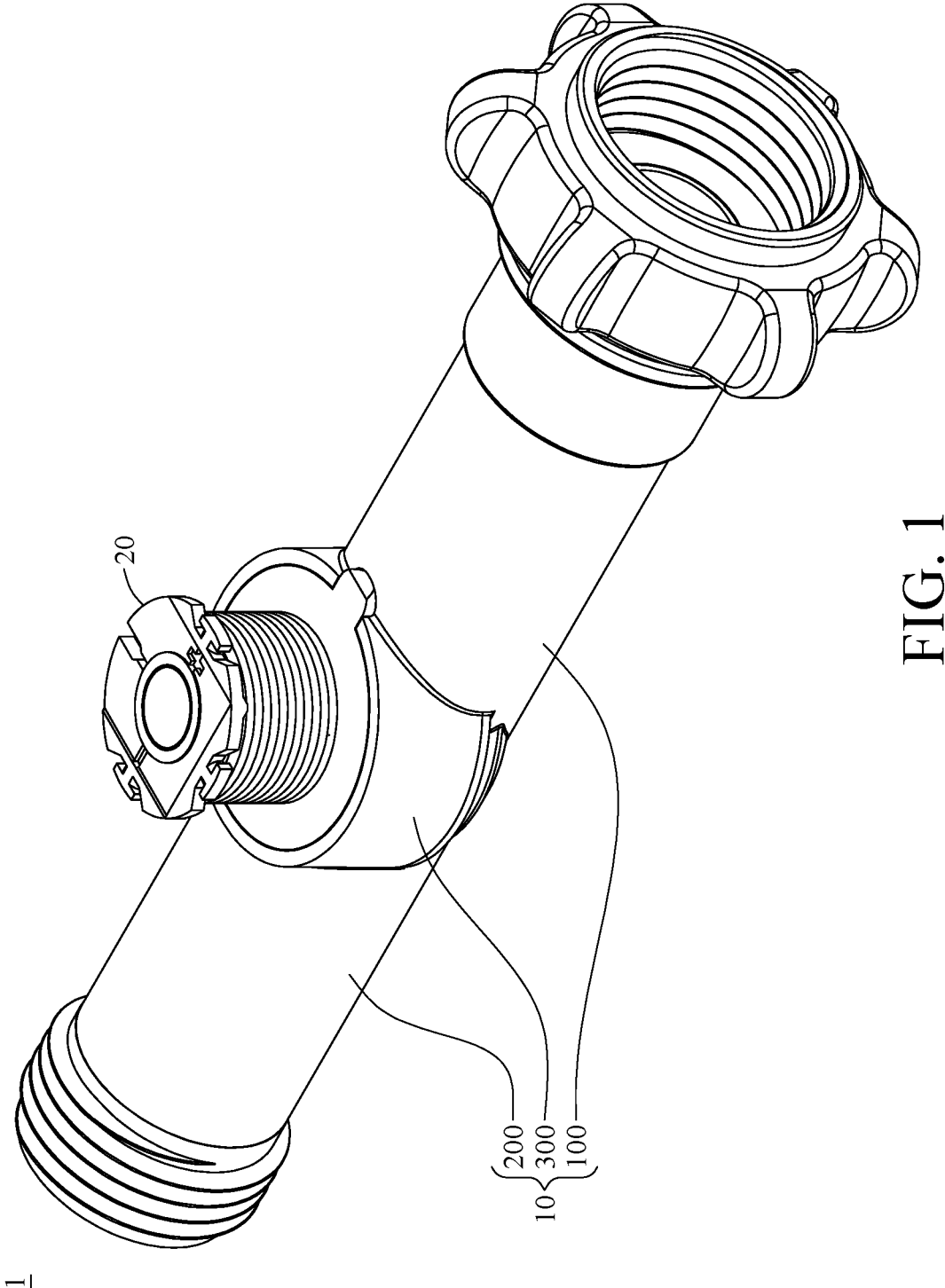
FIG. 1 is a perspective view of a pipeline structure with a valve according to one embodiment of the present disclosure.
Figure 2:
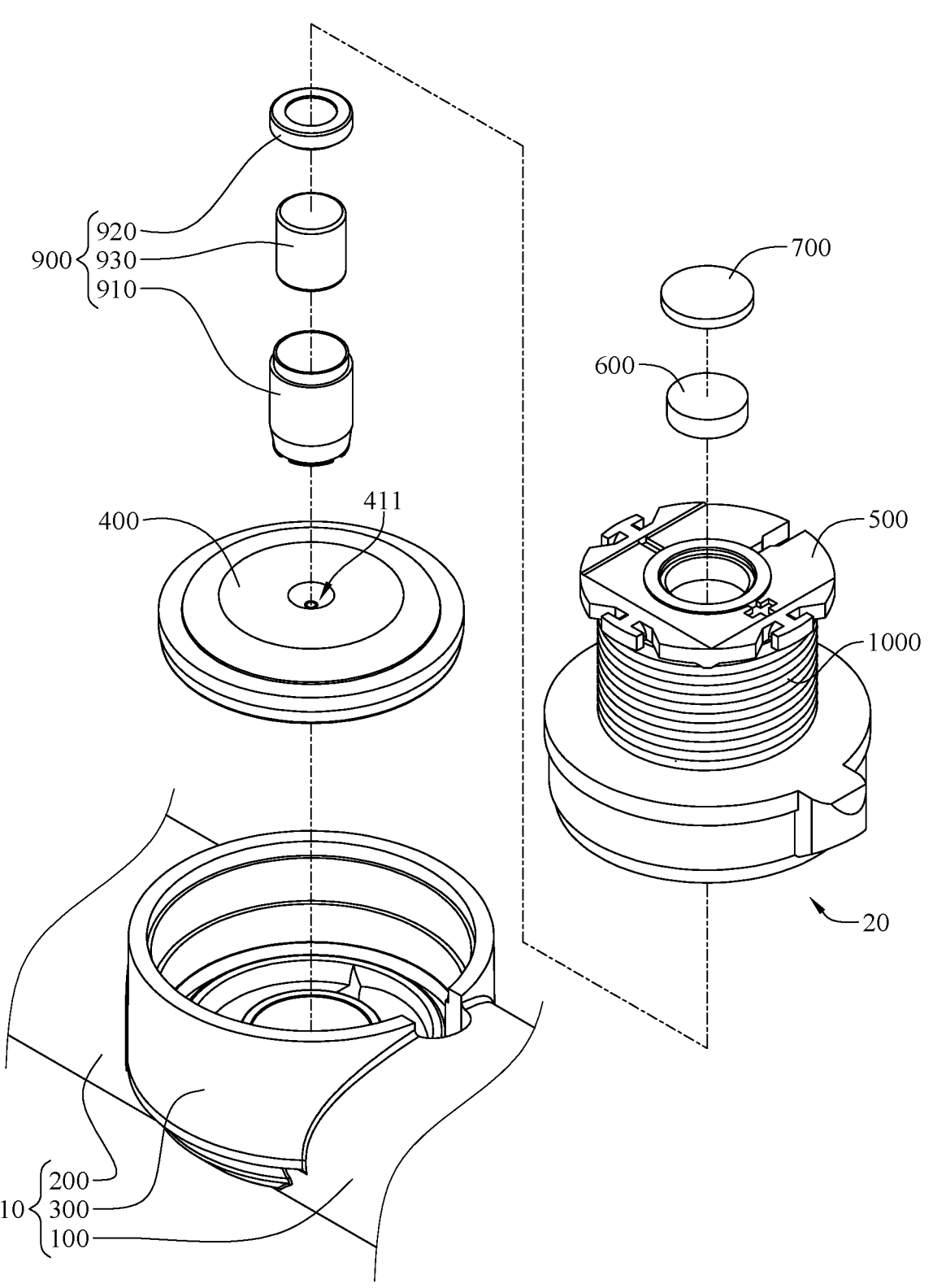
FIG. 2 is an exploded view of the pipeline structure with the valve in FIG. 1.
Figure 3:
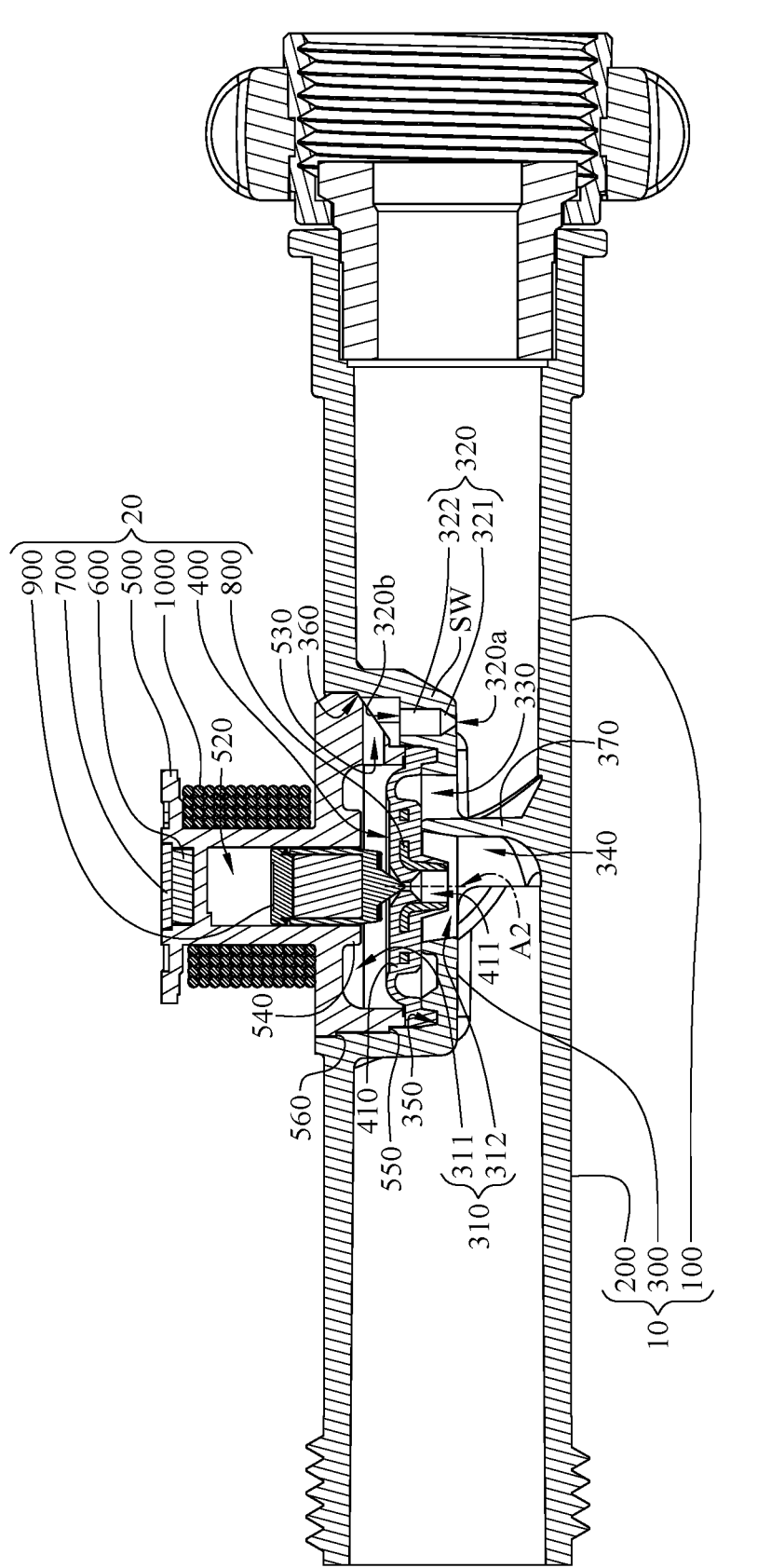
FIG. 3 is a cross-sectional view of the pipeline structure with the valve in FIG. 1.
Figure 4:
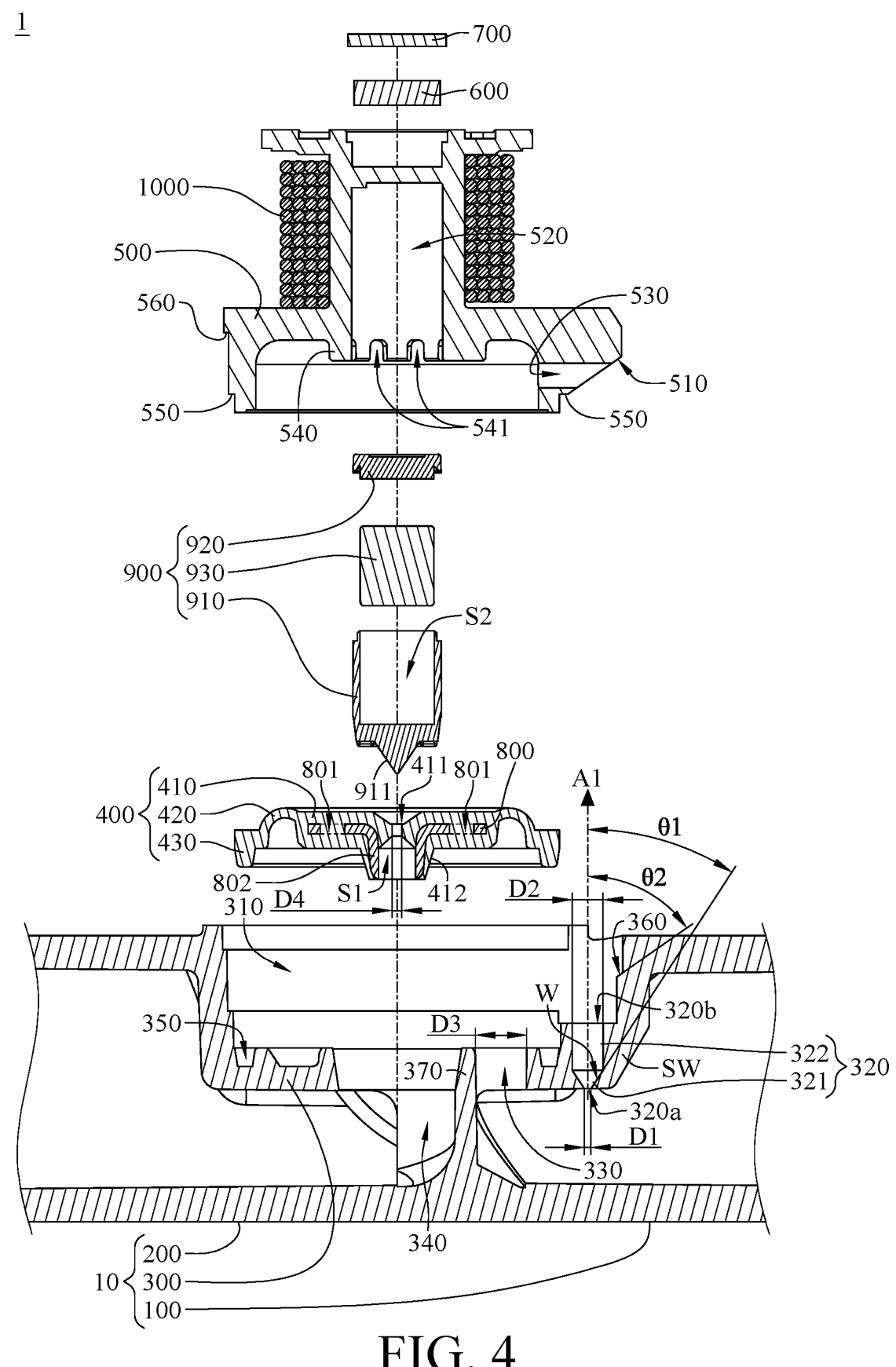
FIG. 4 is a partial and exploded view of the pipeline structure with the valve in FIG. 3.

One embodiment of the present disclosure is illustrated hereinafter. Please refer to FIG. 1 to FIG. 4, where FIG. 1 is a perspective view of a pipeline structure with a valve according to one embodiment of the present disclosure, FIG. 2 is an exploded view of the pipeline structure with the valve in FIG. 1, FIG. 3 is a cross-sectional view of the pipeline structure with the valve in FIG. 1, and FIG. 4 is a partial and exploded view of the pipeline structure with the valve in FIG. 3.

A pipeline structure with a valve (may be regarded as a pipeline structure 1) provided in this embodiment may be applied to a garden hose. The pipeline structure 1 is able to smoothly and properly enable and interrupt the fluid communication since the inner components thereof are designed to move along directions not against the flow. The pipeline structure 1 includes a connection pipe 10 and a flow controller 20. The connection pipe 10 may be made of plastic. The connection pipe 10 includes an inflow passage 100, an outflow passage 200 and an accommodation part 300 located between the inflow passage 100 and the outflow passage 200.

The accommodation part 300 may have a flow chamber 310, a first inlet channel 320, a second inlet channel 330, an outlet channel 340, a surrounding groove 350, a first attachment surface 360 and a surrounding wall 370. The flow chamber 310 has an upper flow chamber 311 and a lower flow chamber 312 that are connected to each other.

The first inlet channel 320 may be formed by, for example, a side wall SW standing at the inflow passage 100. The first inlet channel 320 may have an entrance 320a, an exit 320b, an inlet section 321 and an outlet section 322. The entrance 320a is in fluid communication with the inflow passage 100. The exit 320b is in fluid communication with the upper flow chamber 311. The inlet section 321 may be in fluid communication with the entrance 320a and the outlet section 322. The outlet section 322 may be in fluid communication with the exit 320b. As shown in FIG. 4, the inlet section 321 of the first inlet channel 320 has an opening that may have a size increasing from the entrance 320a along a direction away from the inflow passage 100, such that an inner wall W of the inlet section 321 may be angled to an axial direction A1 of the first inlet channel 320 by a first acute angle θ1. The size of the opening of the inlet section 321 of the first inlet channel 320 at the entrance 320a may be, for example, a diameter of 0.55 millimeters (mm), as denoted by a width D1 in FIG. 4. The size of the opening of the inlet section 321 of the first inlet channel 320 at one end away from the entrance 320a may be, for example, a diameter of 2.5 mm, as denoted by a width D2 in FIG. 4. The first acute angle θ1 may be, for example, 15 degrees, 30 degrees, 40 degrees, 45 degrees, 50 degrees, 60 degrees or 75 degrees. As such, when the flow flows through the first inlet channel 320, the flow flows through the inlet section 321 with increasing cross-sectional area and then flows through the outlet section 322 with substantially the same cross-sectional area.

The second inlet channel 330 is in fluid communication with the inflow passage 100 and the lower flow chamber 312. The second inlet channel 330 has an opening that has a size greater than the size of the opening of the first inlet channel 320. The size of the opening of the second inlet channel 330 along a direction from the inflow passage 100 to the outflow passage 200 (i.e., a direction perpendicular to the axial direction A1) may be, for example, a distance of 4.1 mm, as denoted by a width D3 in FIG. 4. Please be noted that the comparisons of the sizes of the openings referred in this embodiment may be performed based on cross-sectional areas of channels in parallel to a plane where the direction from the inflow passage 100 to the outflow passage 200 is located (i.e., cross-sectional areas where the flow passes, which are two-dimensional sizes) or may be performed based on one-dimensional sizes, such as the width D3 is greater than the width D1 and the width D2, and the present disclosure is not limited thereto. The outlet channel 340 is in fluid communication with the lower flow chamber 312 and the outflow passage 200, and the outlet channel 340 may be located at a side of the second inlet channel 330 away from the first inlet channel 320.

The surrounding groove 350 may be at least partially located between the first inlet channel 320 and the second inlet channel 330, and the surrounding groove 350 may surround the second inlet channel 330 and the outlet channel 340. The first attachment surface 360 may be located at a side of the surrounding groove 350 away from the second inlet channel 330 and the outlet channel 340, and the first attachment surface 360 may be angled to the axial direction A1 of the first inlet channel 320 by a second acute angle θ2, as shown in FIG. 4. The second acute angle θ2 may be 30 degrees, 45 degrees or 60 degrees. The surrounding wall 370 may be located between the second inlet channel 330 and the lower flow chamber 312 and may surround the lower flow chamber 312, and the surrounding wall 370 may be surrounded by the surrounding groove 350.

The flow controller 20 is disposed in the flow chamber 310. The flow controller 20 is configured to selectively enable or interrupt the fluid communication between the upper flow chamber 311 and the lower flow chamber 312 and the fluid communication between the second inlet channel 330 and the lower flow chamber 312.

In detail, the flow controller 20 may include an elastic pad 400, a mounting component 500, a first magnetic element 600, a cover 700, a second magnetic element 800, a valve element 900 and a driving component 1000.

The elastic pad 400 may be made of rubber. The elastic pad 400 is disposed in the flow chamber 310 and divides the flow chamber 310 into the upper flow chamber 311 and the lower flow chamber 312. The elastic pad 400 may be disc-shaped, and the elastic pad 400 may include, in order from an inner side to an outer side thereof, a center part 410, a connection part 420 and a fixed part 430.

The center part 410 may have a hole 411. The hole 411 is in fluid communication with the upper flow chamber 311 and the lower flow chamber 312. The size of the hole 411 at the narrowest part thereof is greater than the size of the opening of the first inlet channel 320 at the entrance 320a (e.g., at the position where the first inlet channel 320 is in fluid communication with the inflow passage 100). The size of the hole 411 at the narrowest part thereof may be, for example, a diameter of 0.8 mm, as denoted by a width D4 in FIG. 4. Please be noted that the comparisons of the sizes of the openings referred in this embodiment may be performed based on cross-sectional areas (two-dimensional sizes) of channels in parallel to the plane where the direction from the inflow passage 100 to the outflow passage 200 is located or may be performed based on one-dimensional sizes, such as the width D4 is greater than the width D1, and the present disclosure is not limited thereto. The connection part 420 may be located between and connected to the center part 410 and the fixed part 430. The fixed part 430 may be regarded as periphery or an outer edge of the disc-shaped elastic pad 400, and the fixed part 430 may be fixed in the surrounding groove 350.

The elastic pad 400 is elastically deformable in the flow chamber 310 so as to selectively enable or interrupt the fluid communication between the second inlet channel 330 and the lower flow chamber 312. Specifically, with the elastic deformation of the connection part 420 with respect to the fixed part 430, the center part 410 is able to move until abutting on one end of the surrounding wall 370. The center part 410 can firmly contact the surrounding wall 370 through slightly elastic deformation thereof so as to interrupt the fluid communication between the second inlet channel 330 and the lower flow chamber 312. Conversely, when the connection part 420 is elastically deformed with respect to the fixed part 430 along a direction away from the surrounding wall 370, the center part 410 is not abutted on the surrounding wall 370, and thus the fluid communication between the second inlet channel 330 and the lower flow chamber 312 is enabled.

The mounting component 500 may be made of plastic. The mounting component 500 is disposed on the accommodation part 300. Specifically, the mounting component 500 may have a second attachment surface 510. The second attachment surface 510 is attached on the first attachment surface 360 so as to accomplish the mounting of the mounting component 500 to the accommodation part 300. For example, the first attachment surface 360 and the second attachment surface 510 may be served as ultrasonic welding surfaces, and the ultrasonic welding process may be performed to combine the first attachment surface 360 and the second attachment surface 510. Similar to the first attachment surface 360, the second attachment surface 510 may be angled to the axial direction A1 of the first inlet channel 320 by the second acute angle θ2. Since the first attachment surface 360 and the second attachment surface 510 both are at the second acute angle θ2 to the axial direction A1 of the first inlet channel 320, the combined contact areas between the accommodation part 300 and the mounting component 500 can be enlarged, thereby preventing flow leakage from the gap between the accommodation part 300 and the mounting component 500. Moreover, the usage of an additional sealing element such as a gasket or an oil seal can also be saved.

The mounting component 500 may further have an inner space 520 and a connection channel 530. The inner space 520 is in fluid communication with the upper flow chamber 311. The connection channel 530 is in fluid communication with the first inlet channel 320 and the upper flow chamber 311. Moreover, the second attachment surface 510 may be located at a side of the connection channel 530 away from the inner space 520 and may surround the connection position between the connection channel 530 and the first inlet channel 320 for preventing flow leakage from the gap between the accommodation part 300 and the mounting component 500.

Further, the mounting component 500 may further have a surrounding protrusion structure 540 at a position of the inner space 520 located close to the upper flow chamber 311. The surrounding protrusion structure 540 surrounds a central axis A2 of the hole 411. The surrounding protrusion structure 540 may have a plurality of hollow parts 541, so that the central side and the peripheral side of the upper flow chamber 311 can be in fluid communication with each other via the hollow parts 541. When the connection part 420 is elastically deformed with respect to the fixed part 430 along the direction away from the surrounding wall 370, the center part 410 moves away from the surrounding wall 370 until abutting on the surrounding protrusion structure 540. At this moment, the flow from the connection channel 530 can still flow towards the central side from the peripheral side of the upper flow chamber 311 via the hollow parts 541, and then can flow towards the hole 411 of the center part 410 without being interrupted due to the elastic deformation of the elastic pad 400.

The first magnetic element 600 is disposed at a side of the mounting component 500 away from the elastic pad 400. The cover 700 can cover the first magnetic element 600 so as to prevent detachment of the first magnetic element 600 from the mounting component 500. The second magnetic element 800 may be disposed in the center part 410 of the elastic pad 400. Specifically, the second magnetic element 800 may have a plurality of through holes 801 arranged around the hole 411 of the center part 410. The through holes 801 can be filled with the center part 410 made of rubber so as to firmly secure the second magnetic element 800 in the center part 410. Moreover, the center part 410 may further have a first protrusion 412 extending towards the outlet channel 340. The second magnetic element 800 may further have a second protrusion 802 also extending towards the outlet channel 340 and disposed inside the first protrusion 412 of the center part 410. The first protrusion 412 and the second protrusion 802 may be hollow-tube-shaped, so that the fluid communication between the hole 411 and the outlet channel 340 via the lower flow chamber 312 can remain uninterrupted through an inner space S1 of the hollow-tube-shaped first protrusion 412 and the second protrusion 802 when the center part 410 is elastically deformed and firmly contacts the surrounding wall 370.

The valve element 900 may include a protector 910, a lid 920 and a permanent magnet 930. The protector 910 has a tapered part 911 tapered off towards the hole 411 of the center part 410. The lid 920 is disposed on the protector 910. The permanent magnet 930 is disposed in an inner space S2 together formed by the protector 910 and the lid 920, such that the permanent magnet 930 can be not in direct contact with flow flowing through the inner space 520 or the upper flow chamber 311, which prevents rust and other deterioration of the permanent magnet 930. The protector 910, the lid 920 and the permanent magnet 930 of the valve element 900 are movably disposed in the inner space 520 of the mounting component 500. Moreover, the permanent magnet 930 of the valve element 900 is able to attract (or is attractive to) the first magnetic element 600 or the second magnetic element 800. Moreover, the valve element 900 is not located on the extension line of the first inlet channel 320. It can be also considered that the first inlet channel 320 is misaligned with the valve element 900 along the axial direction A1 of the first inlet channel 320. It can be also considered that the first inlet channel 320 is not overlapped with the valve element 900 along the axial direction A1 of the first inlet channel 320. Therefore, the movement of the valve element 900 will not affect the flow through the first inlet channel 320, thereby further improving the stability of flow supply.

The driving component 1000 may be coils. The driving component 1000 is wound (or sleeved) on the mounting component 500 and can correspond to the inner space 520 of the mounting component 500. The driving component 1000 is able to drive the valve element 900 to move towards the elastic pad 400, such that the tapered part 911 of the protector 910 is able to be plugged into the hole 411 of the center part 410 to interrupt the fluid communication between the upper flow chamber 311 and the lower flow chamber 312 via the hole 411. Alternatively, the driving component 1000 is able to drive the valve element 900 to move towards the first magnetic element 600, such that the protector 910 moves away from the elastic pad 400 to enable the fluid communication between the upper flow chamber 311 and the lower flow chamber 312 via the hole 411.

In the following, the operation of the pipeline structure 1 will be illustrated. Please refer to FIG. 5 to FIG. 8, which are partial and schematic views showing the pipeline structure with the valve in FIG. 3.

Figure 5:
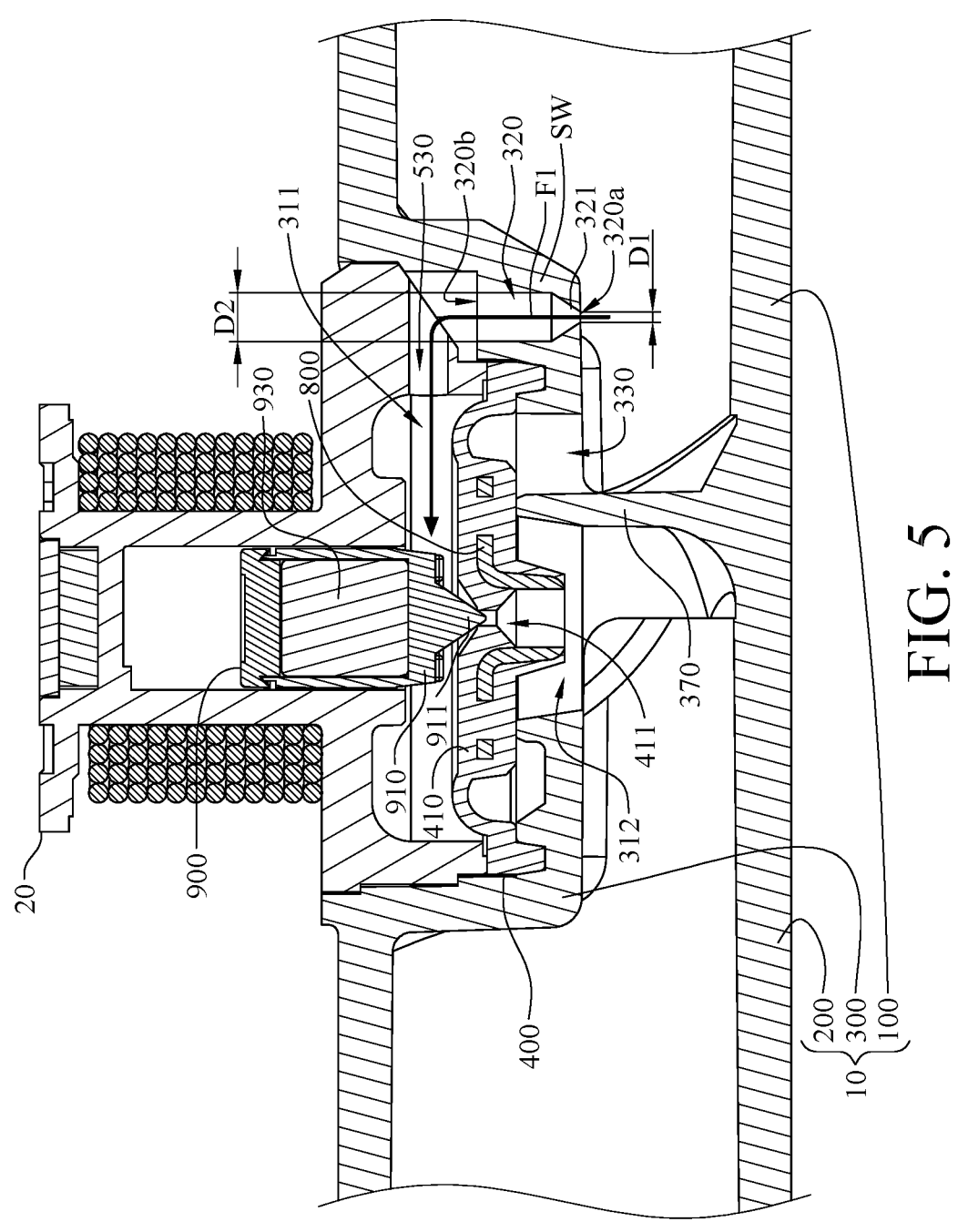
FIG. 5 to FIG. 8 are partial and schematic views showing the pipeline structure with the valve in FIG. 3.

As shown in FIG. 5, the permanent magnet 930 of the valve element 900 attracts the second magnetic element 800, such that the valve element 900 abuts on the elastic pad 400. By doing so, the center part 410 is able to firmly contact the surrounding wall 370 so as to interrupt the fluid communication between the second inlet channel 330 and the lower flow chamber 312. Moreover, the tapered part 911 of the protector 910 is able to be plugged into and seal the hole 411 to interrupt the fluid communication between the upper flow chamber 311 and the lower flow chamber 312. At this moment, inflow fluid only exists in the inflow passage 100, the first inlet channel 320, the connection channel 530 and the upper flow chamber 311 that are in fluid communication with one another, as denoted by an arrow F1. Since the size of the opening of the inlet section 321 of the first inlet channel 320 increases from the entrance 320a (e.g., the increasing cross-sectional area of the first inlet channel 320 makes the width D1 of the first inlet channel 320 increases to the width D2), relatively small impurities flowed into the first inlet channel 320 can keep moving to be discharged from the exit 320b of the first inlet channel 320 instead of blocking the first inlet channel 320, and relatively larger impurities remains in the inflow passage 100 instead of entering the first inlet channel 320.

Figure 6:
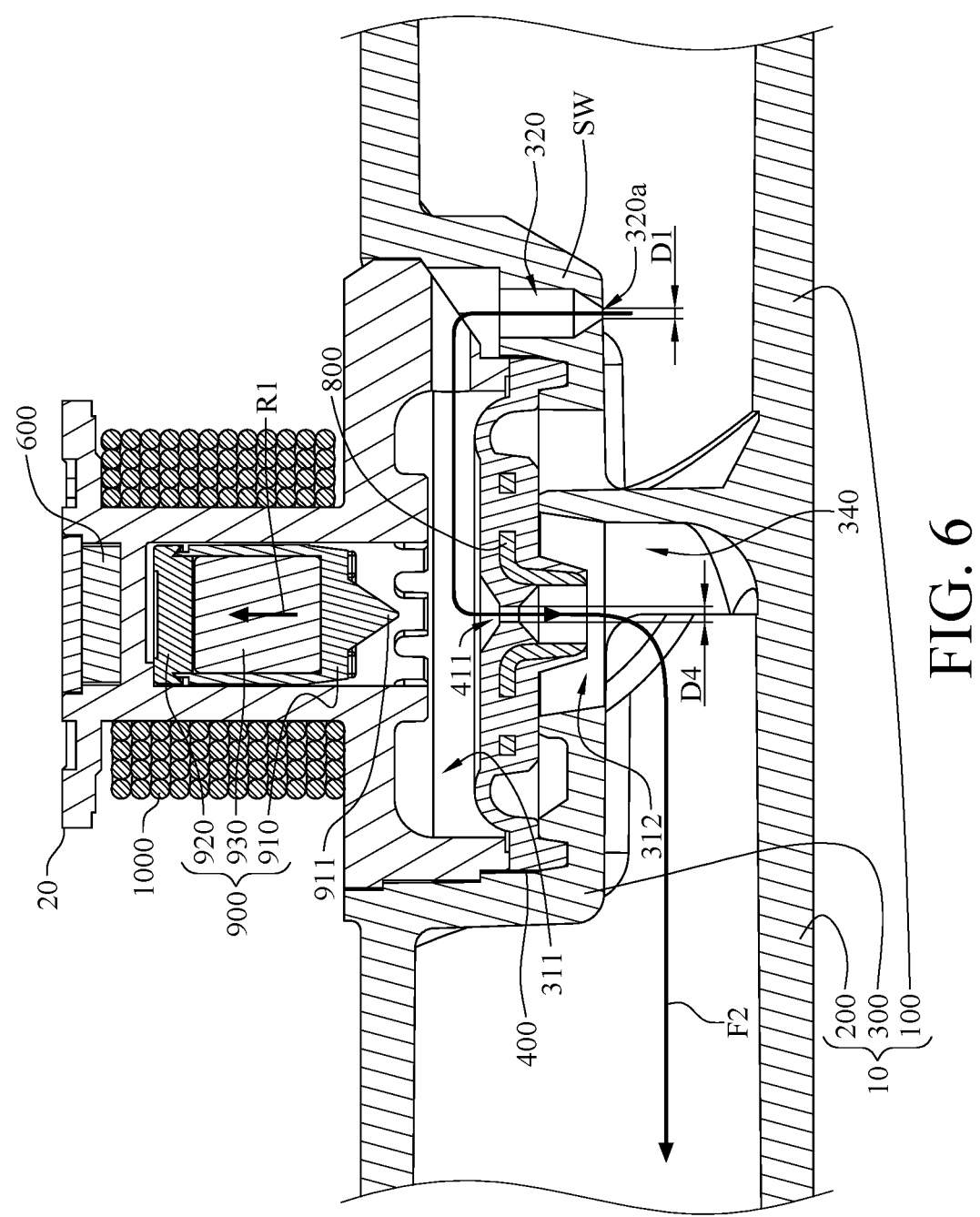

Then, as shown in FIG. 6, the driving component 1000 provides a magnetic field against the attraction between the permanent magnet 930 and the second magnetic element 800, the magnetic field can further force the permanent magnet 930, along with the protector 910 and the lid 920, to move towards the first magnetic element 600 along a direction R1 until the permanent magnet 930 attracts the first magnetic element 600. As such, the valve element 900 moves away from the elastic pad 400, and the hole 411 is not sealed by the tapered part 911 of the valve element 900, so that the fluid communication between the upper flow chamber 311 and the lower flow chamber 312 via the hole 411 can be enabled. At this moment, the inflow fluid in the upper flow chamber 311 is able to flow towards the outflow passage 200 via the lower flow chamber 312 and the outlet channel 340, as denoted by an arrow F2. Moreover, since the size of the hole 411 at the narrowest part thereof is designed to be greater than the size of the opening of the first inlet channel 320 at the entrance 320a (e.g., the difference between cross-sectional areas of the hole 411 and the opening of the first inlet channel 320 makes the width D4 of the hole 411 at the narrowest part thereof to be greater than the width D1 of the first inlet channel 320), the impurities flowed into the first inlet channel 320 can still be discharged from the hole 411 instead of blocking the hole 411.

Figure 7:
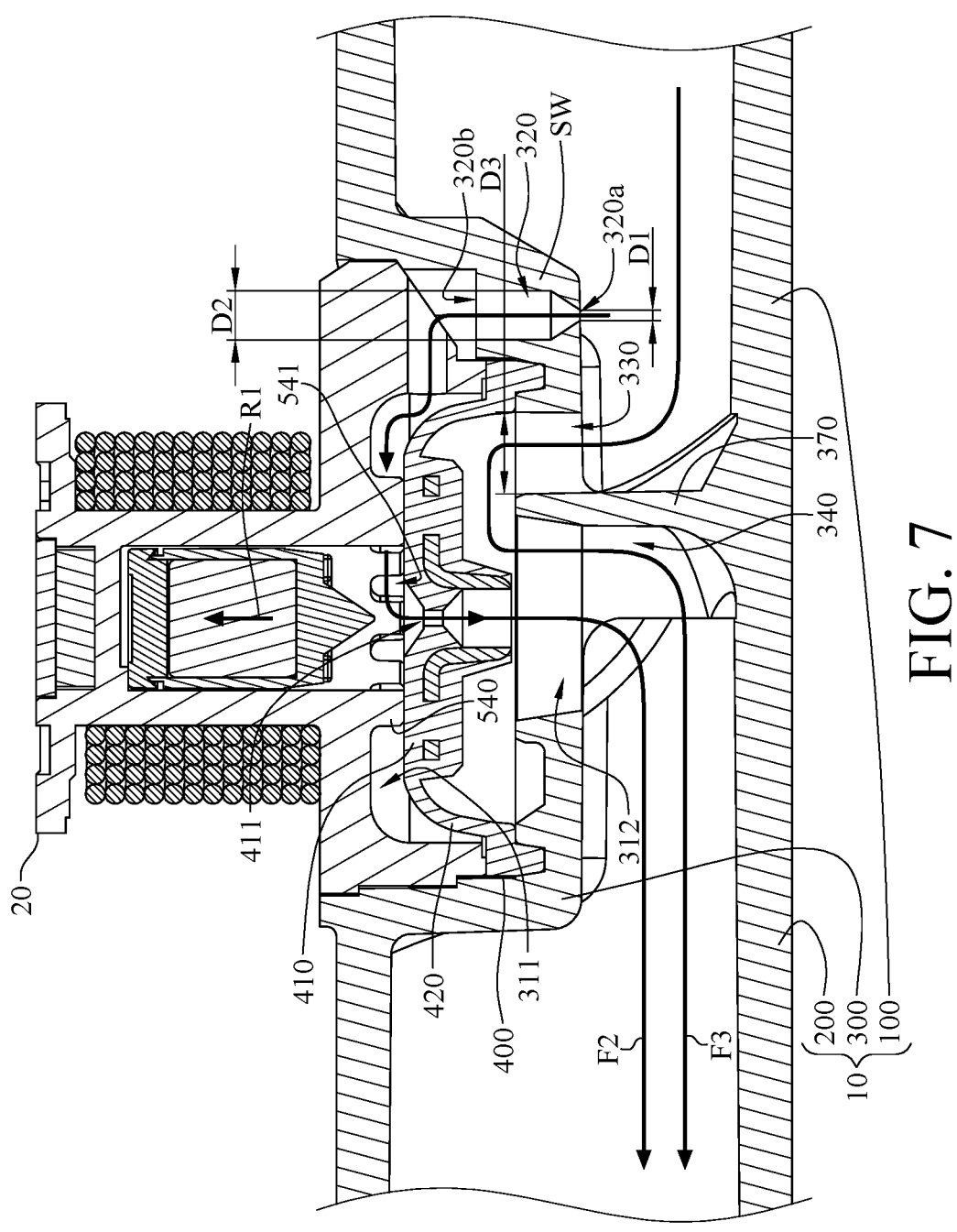

Then, as shown in FIG. 7, since the size of the of the opening of the second inlet channel 330 is designed to be greater than the size of the opening of the first inlet channel 320 (e.g., the difference between cross-sectional areas of the openings of the second inlet channel 330 and the first inlet channel 320 makes the width D3 of the second inlet channel 330 to be greater than the width D1 and the width D2 of the first inlet channel 320), the pressure of fluid accumulated in the second inlet channel 330 is greater than the pressure of fluid flowing into the upper flow chamber 311 from the first inlet channel 320, such that the connection part 420 of the elastic pad 400 can be elastically deformed away from the lower flow chamber 312 along the direction R1. Accordingly, the surrounding wall 370 is not abutted by the center part 410, and thus the fluid communication between the inflow passage 100 and the lower flow chamber 312 via the second inlet channel 330 can be enabled. At this moment, the inflow fluid from the inflow passage 100 is able to flow from the second inlet channel 330 towards the outflow passage 200 via the lower flow chamber 312 and the outlet channel 340, as denoted by an arrow F3. Since the size of the opening of the second inlet channel 330 is greater than the size of the opening of the first inlet channel 320, the relatively large impurities remaining in the inflow passage 100 can be brought into the lower flow chamber 312 by the flow when the second inlet channel 330 is in fluid communication with the lower flow chamber 312 instead of blocking the entrance 320a of the first inlet channel 320. In addition, the surrounding protruded structure 540 has a plurality of hollow parts 541, and thus the flow originally flowing into the upper flow chamber 311 along the arrow F2 can still flow through the hollow parts 541 instead of being interrupted and then can keep flowing towards the outflow passage 200 via the hole 411, the lower flow chamber 312 and the outlet channel 340.

Figure 8:
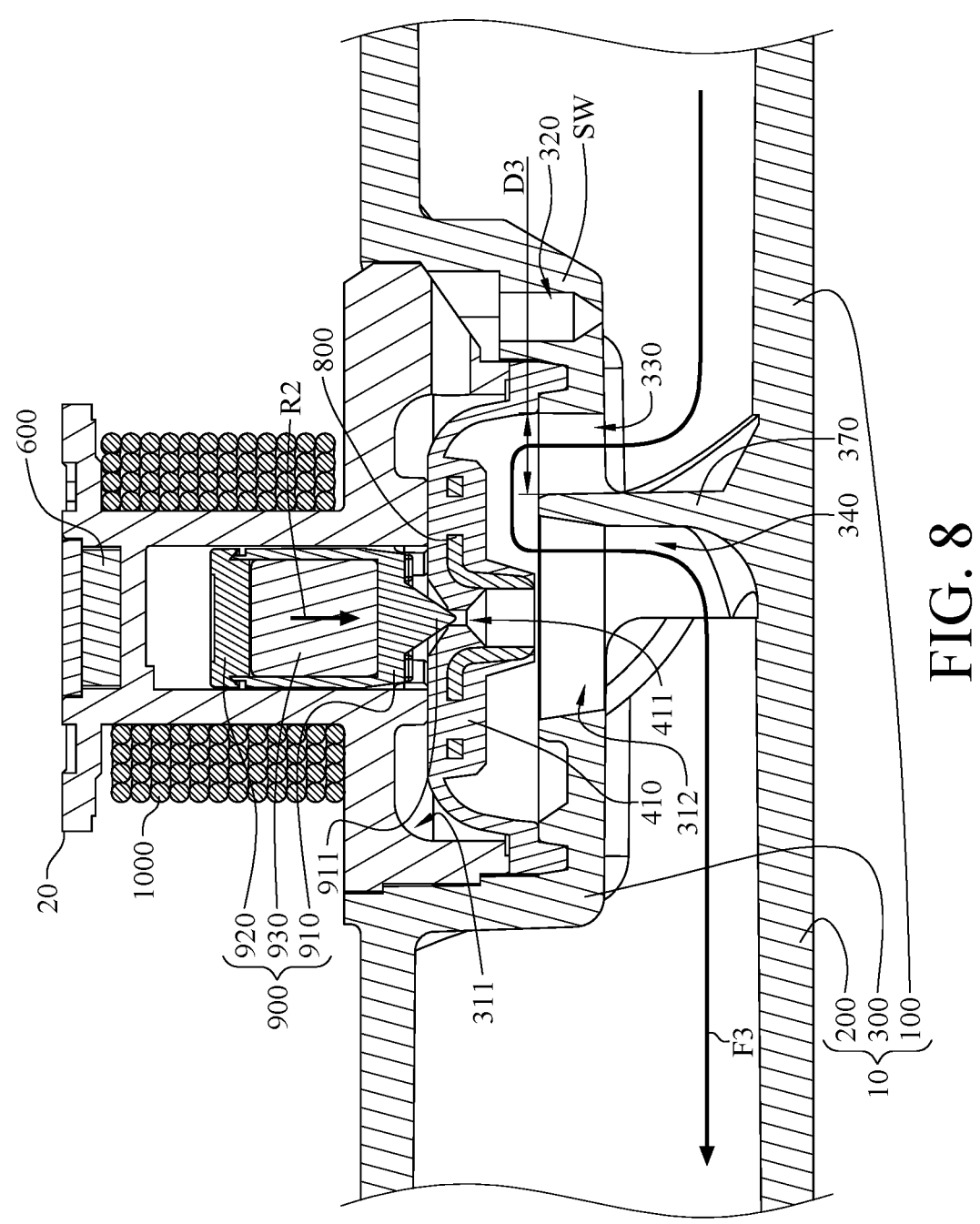

Then, as shown in FIG. 8, the driving component 1000 provides another magnetic field against the attraction between the permanent magnet 930 and the first magnetic element 600, the another magnetic field can further force the permanent magnet 930, together with the protector 910 and the lid 920, to move towards the second magnetic element 800 along a direction R2 until the tapered part 911 is plugged into and seals the holes 411 again. As such, the valve element 900 interrupts the fluid communication between the upper flow chamber 311 and the lower flow chamber 312 via the hole 411. At this moment, the inflow fluid from the inflow passage 100 flows towards the outflow passage 200 only via the second inlet channel 330, the lower flow chamber 312 and the outlet channel 340 (as denoted by the arrow F3) instead of flowing through the first inlet channel 320 and the upper flow chamber 311. As such, the inflow fluid from the inflow passage 100 completely flows through the second inlet channel 330 with a relatively large size, and thus impurities blockage can be prevented.

Once the hole 411 is sealed by the tapered part 911, inflow fluid therefore accumulates in the upper flow chamber 311 to increase the pressure inside the upper flow chamber 311 instead of discharging from the hole 411. When the pressure inside the upper flow chamber 311 is increased to be greater than the pressure inside the lower flow chamber 312, the pressure inside the upper flow chamber 311 moves the elastic pad 400 until the elastic pad 400 firmly contacts the surrounding wall 370 to seal the lower flow chamber 312. By doing so, the fluid communication between the inflow passage 100 and the lower flow chamber 312 via the second inlet channel 330 is interrupted, and the pipeline structure 1 returns to the state shown in FIG. 5 from the state shown in FIG. 8. After the inflow fluid inside the lower flow chamber 312 is discharged from the outlet channel 340, the remaining inflow fluid only exists in the inflow passage 100, the first inlet channel 320, the connection channel 530 and the upper flow chamber 311 that are in fluid communication with one another, as denoted by the arrow F1 shown in FIG. 5. Moreover, in the pipeline structure 1 as depicted in FIG. 5, when the water ceases to flow in the inflow passage 100, the first inlet channel 320, the connection channel 530 and the upper flow chamber 311, relatively large impurities in the inflow passage 100 will drop down due to gravity, instead of blocking the entrance 320a of the first inlet channel 320.

During the operation of the pipeline structure 1 as shown in FIG. 5 to FIG. 8, since the movement of the valve element 900 is designed to move along directions not against the flow, the valve element 900 can be accurately moved by the driving component 1000 without any offset. Accordingly, each fluid communication in the pipeline structure 1 can be enabled and interrupted smoothly and properly, thereby reliably controlling the flow.

In some embodiments of the present disclosure, the mounting component 500 may further have a first step structure 550, as shown in FIG. 3 and FIG. 4. The first step structure 550 is disposed between the second attachment surface 510 and the second inlet channel 330 and surrounds the flow chamber 310. The first step structure 550, similar to the second attachment surface 510, may be served as an ultrasonic welding surface so as to strengthen the combination between the accommodation part 300 and the mounting component 500, thereby further preventing flow leakage from the gap between the accommodation part 300 and the mounting component 500.

In some embodiments of the present disclosure, the mounting component 500 may further have a second step structure 560, as shown in FIG. 3 and FIG. 4. The second step structure 560 surrounds the flow chamber 310. The connection channel 530 is located between the first step structure 550 and the second step structure 560. The second step structure 560 is able to further secure the combination between the accommodation part 300 and the mounting component 500, thereby further preventing flow leakage from the gap between the accommodation part 300 and the mounting component 500.

According to the pipeline structure with a valve discussed above, since the first inlet channel is formed at the side wall standing at the inflow passage, the fluid communication between the inflow passage and the upper flow chamber can be separated from the elastic pad of the flow controller. Accordingly, the enablement and interruption of the fluid communication between the upper flow chamber and the lower flow chamber and the enablement and interruption of the fluid communication between the second inlet channel and the lower flow chamber would not be affected by the elastic deformation of the elastic pad, and thereby a stable flow can be supplied to the upper flow chamber and the pipeline structure with the valve of the present disclosure can be operated smoothly.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A pipeline structure (1) with a valve, comprising:
a connection pipe (10), comprising:
an inflow passage (100) and an outflow passage (200); and
an accommodation part (300), located between the inflow passage (100) and the outflow passage (200), the accommodation part (300) having:
a flow chamber (310), having an upper flow chamber (311) and a lower flow chamber (312) that are in fluid communication with each other;
a first inlet channel (320), in fluid communication with the inflow passage (100) and the upper flow chamber (311), wherein the first inlet channel (320) is formed by a side wall (SW) standing at the inflow passage (100), the first inlet channel (320) has an inlet section (321) in fluid communication with the inflow passage (100), the inlet section (321) has an opening that has a size increasing along a direction away from the inflow passage (100), and the inlet section (321) with the size of the opening increasing along the direction away from the inflow passage (100) is in uninterrupted space communication with and in uninterrupted fluid communication with the inflow passage (100) and the upper flow chamber (311);
a second inlet channel (330), in fluid communication with the inflow passage (100) and the lower flow chamber (312); and
an outlet channel (340), in fluid communication with the lower flow chamber (312) and the outflow passage (200); and
a flow controller (20), disposed in the flow chamber (310), wherein the flow controller (20) is configured to selectively enable or interrupt a fluid communication between the upper flow chamber (311) and the lower flow chamber (312) and a fluid communication between the second inlet channel (330) and the lower flow chamber (312), and the flow controller (20) comprises:
an elastic pad (400), disposed in the flow chamber (310) to divide the flow chamber (310) into the upper flow chamber (311) and the lower flow chamber (312), wherein the elastic pad (400) is elastically deformable in the flow chamber (310) so as to selectively enable or interrupt the fluid communication between the second inlet channel (330) and the lower flow chamber (312), the elastic pad (400) has a hole (411) in fluid communication with the upper flow chamber (311) and the lower flow chamber (312);
wherein a fluid pathway to the upper flow chamber (311) from the inlet section (321) with the size of the opening increasing along the direction away from the inflow passage (100) is spaced apart from the elastic pad (400), and the size of the opening of the inlet section (321) increases directly from a boundary between the first inlet channel (320) and the inflow passage (100).

2. The pipeline structure (1) with the valve according to claim 1, wherein the first inlet channel (320) has the inlet section (321) and an outlet section (322) that are in fluid communication with each other, and the outlet section (322) is in fluid communication with the upper flow chamber (311).

3. The pipeline structure (1) with the valve according to claim 1, wherein the flow controller (20) further comprises:
a mounting component (500), disposed on the accommodation part (300), wherein the mounting component (500) has an inner space (520) and a connection channel (530), the inner space (520) is in fluid communication with the upper flow chamber (311), and the connection channel (530) is in fluid communication with the first inlet channel (320) and the upper flow chamber (311);
a first magnetic element (600), disposed at a side of the mounting component (500) away from the elastic pad (400);
a valve element (900), movably disposed in the inner space (520) of the mounting component (500); and
a driving component (1000), sleeved on the mounting component (500), wherein the driving component (1000) selectively drives the valve element (900) to move towards the elastic pad (400) so as to interrupt the fluid communication between the upper flow chamber (311) and the lower flow chamber (312) via the hole (411) of the elastic pad (400), or the driving component (1000) selectively drives the valve element (900) to move towards the first magnetic element (600) so as to be away from the elastic pad (400) to enable the fluid communication between the upper flow chamber (311) and the lower flow chamber (312) via the hole (411) of the elastic pad (400).

4. The pipeline structure (1) with the valve according to claim 3, wherein the accommodation part (300) further has a first attachment surface (360), the mounting component (500) further has a second attachment surface (510), the first attachment surface (360) and the second attachment surface (510) are attached to each other, and each of the first attachment surface (360) and the second attachment surface (510) is angled to an axial direction (A1) of the first inlet channel (320) by an acute angle (01).

5. The pipeline structure (1) with the valve according to claim 4, wherein the mounting component (500) further has a first step structure (550) disposed between the second attachment surface (510) and the second inlet channel (330) and surrounding the flow chamber (310).

6. The pipeline structure (1) with the valve according to claim 5, wherein the mounting component (500) further has a second step structure (560) surrounding the flow chamber (310), and the connection channel (530) is located between the first step structure (550) and the second step structure (560).

7. The pipeline structure (1) with the valve according to claim 3, wherein the second inlet channel (330) has an opening that has a size greater than a size of an opening of the first inlet channel (320), and a size of the hole (411) of the elastic pad (400) is greater than the size of the opening of the first inlet channel (320) at a position where is in fluid communication with the inflow passage (100).

8. The pipeline structure (1) with the valve according to claim 3, wherein the accommodation part (300) further has a surrounding groove (350) at least partially located between the first inlet channel (320) and the second inlet channel (330), and the elastic pad (400) has an outer edge disposed in the surrounding groove (350).

9. The pipeline structure (1) with the valve according to claim 3, wherein the flow controller (20) further comprises a second magnetic element (800) disposed in the elastic pad (400).

10. The pipeline structure (1) with the valve according to claim 3, wherein the valve element (900) comprises a protector (910) and a permanent magnet (930) disposed in the protector (910).

11. The pipeline structure (1) with the valve according to claim 3, wherein the first inlet channel (320) is misaligned with the valve element (900) along an axial direction (A1) of the first inlet channel (320).

* * * * *